July 8, 1924. 1,500,849
W. J. RUDOLPH
TIRE PROTECTOR
Filed May 26, 1922
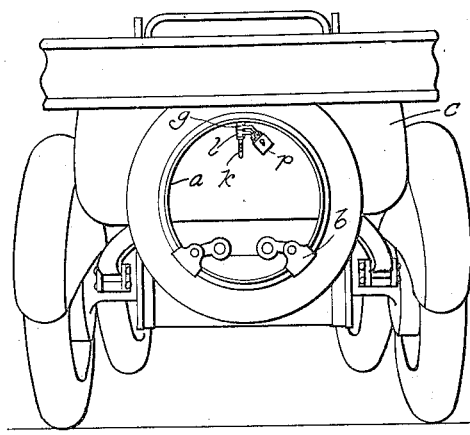
Fig. 1
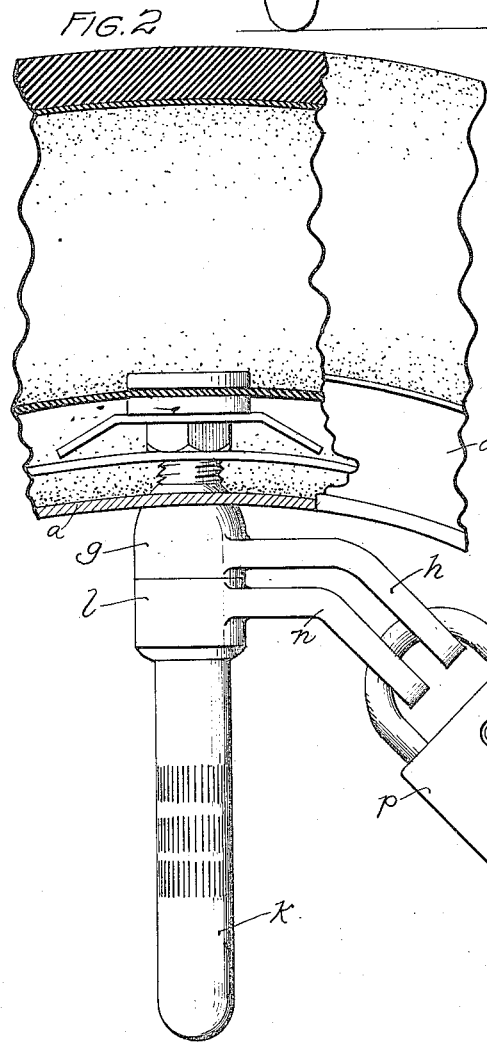
Fig. 2
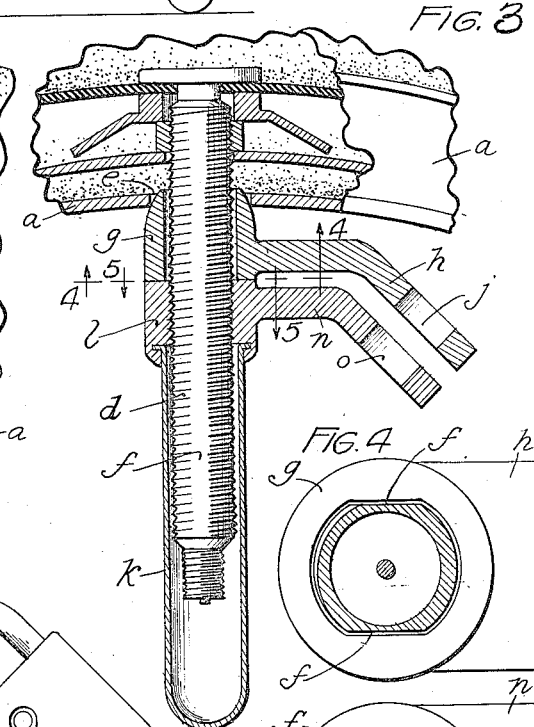
Fig. 3
Fig. 4
Fig. 5
INVENTOR:
Walter J. Rudolph,
By John Howard McElroy
HIS ATTY.

Patented July 8, 1924.

1,500,849

UNITED STATES PATENT OFFICE.

WALTER J. RUDOLPH, OF CHICAGO, ILLINOIS, ASSIGNOR TO IMPERIAL BRASS MANUFACTURING COMPANY, OF CHICAGO, ILLINOIS, A CORPORATION OF ILLINOIS.

TIRE PROTECTOR.

Application filed May 26, 1922. Serial No. 563,771.

*To all whom it may concern:*

Be it known that I, WALTER J. RUDOLPH, a citizen of the United States, and a resident of Chicago, in the county of Cook and State of Illinois, have invented certain new and useful Improvements in Tire Protectors, of which the following is a specification.

My invention is concerned with tire protectors, and is designed to be used to prevent spare tires of automobiles from being stolen by deflating them so that they can be removed from the rings upon which they are usually carried.

To this end, it consists of an elongated cap adapted to be be quickly applied to the inflation valve of a tire supported on a ring and locked in place, preferably by a padlock, so as to prevent its deflation until the cap has been unlocked and removed.

To illustrate my invention I annex hereto a sheet of drawings in which the same reference characters are used to designate identical parts in all the figures, of which—

Fig. 1 is a rear elevation of an automobile showing a spare tire protected by my device;

Fig. 2 is a section through a tire, on an enlarged scale, having my invention applied thereto;

Fig. 3 is a similar view, but with the protector in section; and

Figs. 4 and 5 are sections on the lines 4—4 and 5—5, of Fig. 3, but on a still larger scale.

I have shown my invention as applied to the ring $a$ supported by the brackets $b$ from the rear of an automobile $c$, and having the threaded inflation valve $d$ extending through the customary aperture $e$ in the rim $a$. Slid upon the valve $d$, which preferably has the two flattened sides $f$, is the locking member consisting of the ring $g$, the interior of which has its cross-section corresponding to that of the flattened valve $d$, so that the ring $g$ can be slid freely but not turned upon the valve. The ring $g$ is provided with the extension $h$, preferably shaped as shown so that it will fit inside of the ring $a$, and having the aperture $j$ in the end thereof. The locking cap $k$ preferably takes the form of a tube closed at one end and secured in the ring or collar $l$, which, as seen in Fig. 5, is circular in its internal cross-section, of a diameter slightly greater than that of the threaded inflation valve $d$, except for two portions $m$, which are provided with breech threads, which, when turned in register with the flattened portions $f$ permit the cap to be slid in place on the valve. The ring $l$ is provided with the extension $n$, of the same shape as the extension $h$, and like it, provided with the aperture $o$ adapted to stand in alinement with the aperture $j$ when the cap is turned, as shown in Fig. 3, in which case, the mutilated threads $m$ engage the threads of the valve $d$, and prevent the cap from being removed. With the parts in this position, the shackle of a padlock $p$, which may be of any desired kind is passed through the apertures $j$ and $o$, and locked, and then it is impossible to remove the cap until the padlock has been unlocked, removed and the cap $k$ removed by turning it until the mutilated threads $m$ are in register with the flattened portions $f$ of the inflation valve.

While I have shown and described my invention as embodied in the form which I at present consider best adapted to carry out its purposes, it will be understood that it is capable of modifications, and that I do not desire to be limited in the interpretation of the following claims, except as may be necessitated by the state of the prior art.

What I claim as new and desire to secure by Letters Patent of the United States is:

1. In a tire protector, the combination with a supporting member through which the inflation valve of a tire extends, of a locking member associated with the valve and having an aperture therethrough, a locking cap also provided with an aperture adapted to be brought adjacent the locking member while covering the valve and to be turned on the valve to bring its aperture into register with that of the locking member and to prevent its removal while so turned, and a padlock adapted to engage the apertures.

2. In a tire protector, the combination with a supporting member, of a threaded valve tube having a flattened side adapted to be passed through said supporting member, a locking member having an aperture for the valve tube upon which it slides but cannot turn and another aperture, a locking cap having an aperture with a mutilated thread portion adapted to be slid past the flattened side of the valve tube and to be turned to cause the mutilated thread to engage the threads of the valve tube and having another aperture brought by the turning into register with the second aperture of the locking member, and a padlock adapted to engage the second apertures of said locking member and locking cap.

In witness whereof I have hereunto set my hand this 16th day of May, 1922.

WALTER J. RUDOLPH.

In the presence of—
JOHN HOWARD MCELROY.